United States Patent [19]

Benton

[11] Patent Number: 4,486,070
[45] Date of Patent: Dec. 4, 1984

[54] MIRROR-ABSORBER FOR USE IN THE ILLUMINATION OF TRANSMISSION HOLOGRAMS

[75] Inventor: Stephen A. Benton, Lincoln, Mass.

[73] Assignee: Polaroid Corporation, Cambridge, Mass.

[21] Appl. No.: 539,932

[22] Filed: Oct. 7, 1983

Related U.S. Application Data

[62] Division of Ser. No. 253,671, Apr. 13, 1981, Pat. No. 4,429,947.

[51] Int. Cl.³ .............. G02B 27/02; G02B 17/00; G03H 1/22
[52] U.S. Cl. .................... 350/3.85; 350/277; 350/448; 40/361
[58] Field of Search ............ 350/448, 3.6, 3.74, 350/3.85, 3.86, 276 SL, 277, 278; 40/361, 362

[56] References Cited

U.S. PATENT DOCUMENTS

| 3,134,021 | 5/1964 | Ploke | 350/448 |
| 3,633,989 | 1/1972 | Benton | 350/3.5 |
| 3,944,322 | 3/1976 | Benton | 350/3.5 |
| 4,070,100 | 1/1978 | Akiyoshi | 350/276 R |

OTHER PUBLICATIONS

"Physics for Students of Science and Engineering, Part II, Second Edition, by Halliday and Resnick, Published in 1962, p. 946.

Primary Examiner—John K. Corbin
Assistant Examiner—William Propp
Attorney, Agent, or Firm—Edward S. Roman

[57] ABSTRACT

Apparatus for illuminating transmission holograms from the rear with an illumination source located in front of the hologram, comprising a reflector and a light trap adapted to be mounted behind the hologram at a location chosen to reflect light from the source through the hologram as though from a source behind the hologram, while reflecting ambient light from the direction of an observer of the hologram into the trap.

3 Claims, 11 Drawing Figures

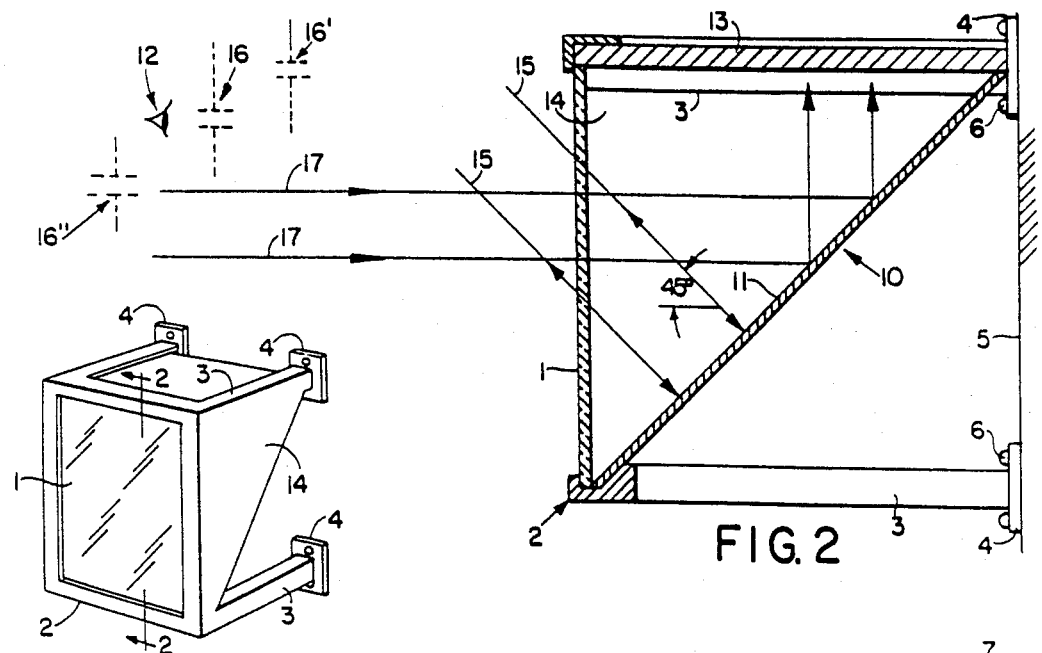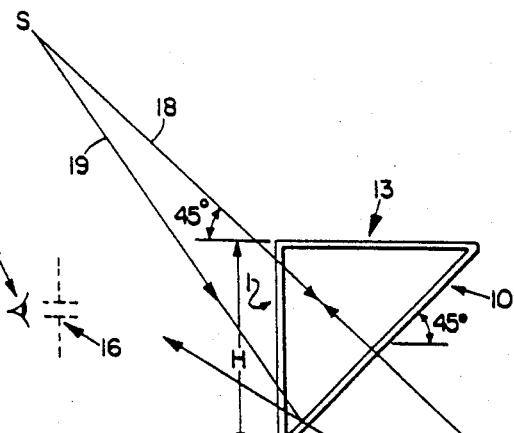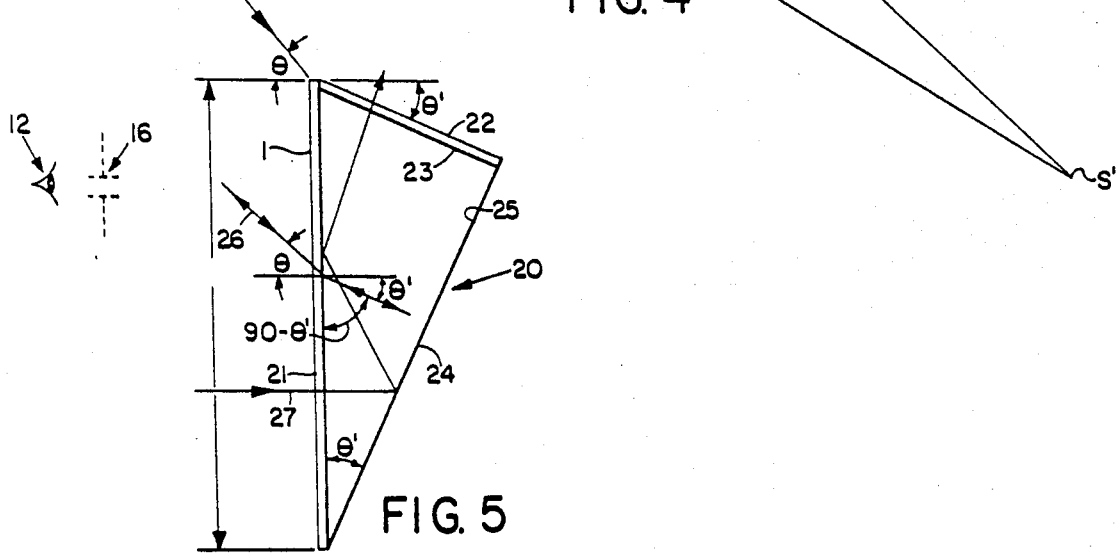
FIG. 1    FIG. 2    FIG. 3    FIG. 4    FIG. 5

MIRROR-ABSORBER FOR USE IN THE ILLUMINATION OF TRANSMISSION HOLOGRAMS

This is a division of application Ser. No. 253,671, filed Apr. 13, 1981, now U.S. Pat. No. 4,429,947.

This invention relates to optical imaging, and particularly to novel apparatus for illuminating light transmission holograms.

Transmission holograms are capable of producing images superior to those produced by reflection holograms. However, reflection holograms can be wall-mounted, a highly desirable feature for many purposes, while transmission holograms that are to be viewed from one side have previously required an illuminating source some distance away on the other side. Since the space behind such a rear-illuminated hologram can not usually be well utilized, the requirement for a rear source of illumination has limited the use of transmission holograms. The principle object of this invention is to enable the rear illumination of a transmission hologram with only a modest requirement for space behind the hologram.

The above and other objects of the invention are attained by the use of a reflector combined with a light trap in such a way that when mounted behind a transmission hologram and illuminated by a source in front of the hologram, light from the source will be reflected back through the hologram from a virtual source corresponding to the illumination source for which the hologram was designed. Ambient light from other sources will for the most part be reflected into the light trap.

In accordance with one embodiment of the invention, suitable for use with transmission holograms intended for illumination with monochromatic light, white light or other radiation comprising any set of wavelengths from either a point source or a collimated source such as sunlight, sufficiently collimated light from an incandescent lamp, or the like, illuminating apparatus in accordance with the invention may take the form of a mirror arranged behind the hologram and at an angle of 45° to the hologram, together with a light absorbing surface completing a triangle with the mirror and the hologram to trap undesired light. This apparatus functions to reflect light falling onto the mirror from a source on the same side as the observer and above or below the observer's line of sight back through the hologram to simulate an illuminating source behind the hologram, thus presenting a holographic image to the observer. Undesired light coming from the vicinity of the observer will be reflected onto and absorbed by the light absorbing surface.

In accordance with a second embodiment of the invention, the depth of the illuminating apparatus behind the hologram may be reduced by replacing the mirror with a prism. This embodiment is particularly suited for simulating a collimated monochromatic illuminating source behind the hologram.

In accordance with another embodiment of the invention, the single mirror and light absorber are replaced by a segmented reflector and absorber of greatly reduced depth behind the hologram, in a structure analogous to a fresnel mirror but also incorporating the light absorbing function of the single mirror and light absorbing trap. The simplest version of this embodiment is adapted to simulate a collimated illuminating source of white or monochromatic light. This structure can be modified, in a manner to be described, to simulate a point illuminating source.

The construction and mode of operation of the above and other embodiments of the invention will best be understood in the light of the following detailed description, together with the accompanying drawings.

In the drawings,

FIG. 1 is a schematic three quarter perspective sketch of a hologram and apparatus for the illumination of the hologram in accordance with one embodiment of the invention;

FIG. 2 is a cross-sectional view of the apparatus of FIG. 1, on an enlarged scale, as seen essentially along the lines 2—2 in FIG. 1;

FIG. 3 is a cross-sectional view, on an enlarged scale and with parts broken away, of a mounted hologram forming a part of the apparatus of FIGS. 1 and 2;

FIG. 4 is a diagrammatic sketch of the optical elements of the apparatus of FIGS. 1 and 2, illustrating the effect of illumination with a point source;

FIG. 5 is a diagrammatic sketch of a modification of the light reflecting and light absorbing apparatus of the invention, illustrating the effect of illumination with a colimated source of monochromatic light;

Figure 6:
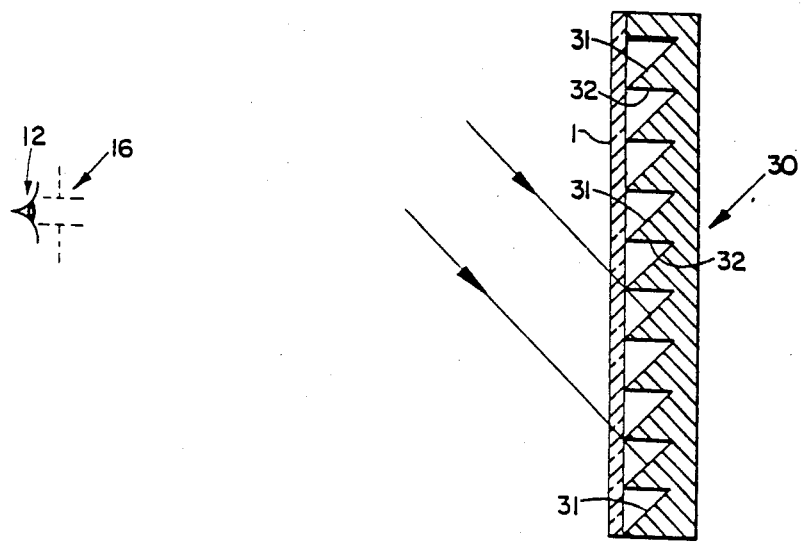
FIG. 6 is a diagrammatic cross-sectional elevational sketch of a hologram combined with a reflector and light trap in accordance with another modification of the invention, illustrating the effects of illumination with a collimated source of white or monochromatic light.
Figure 7:
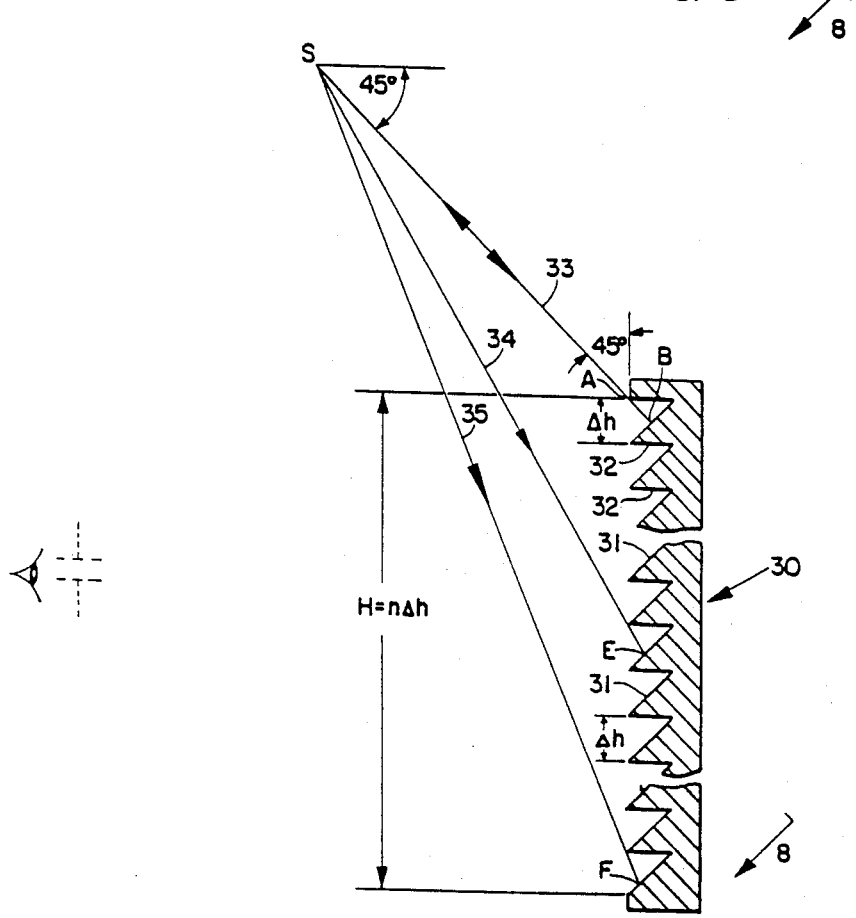
FIG. 7 is a sketch similar to FIG. 6, illustrating illumination of the apparatus of FIG. 6 with a point source.
Figure 8:
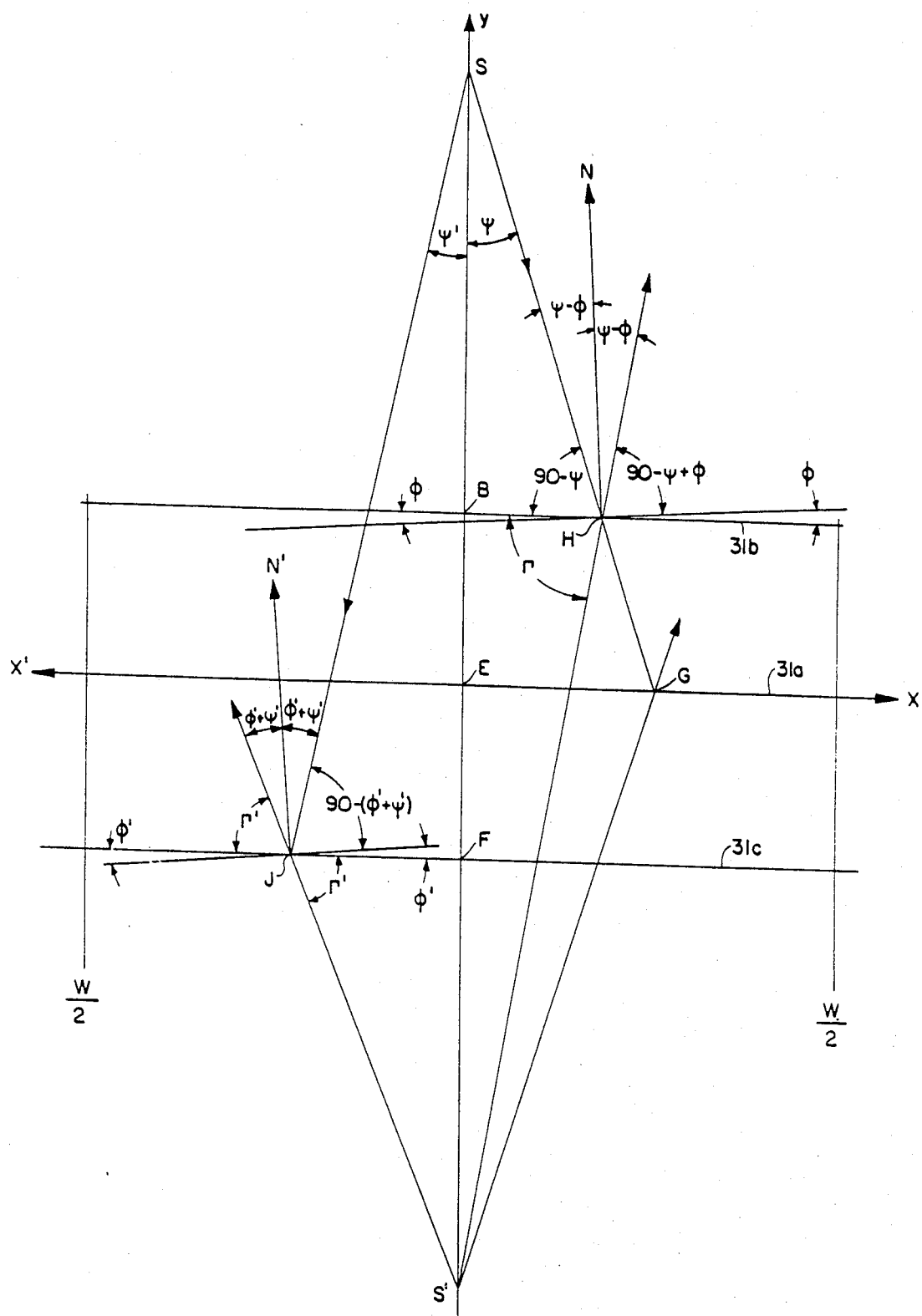
Figure 9:
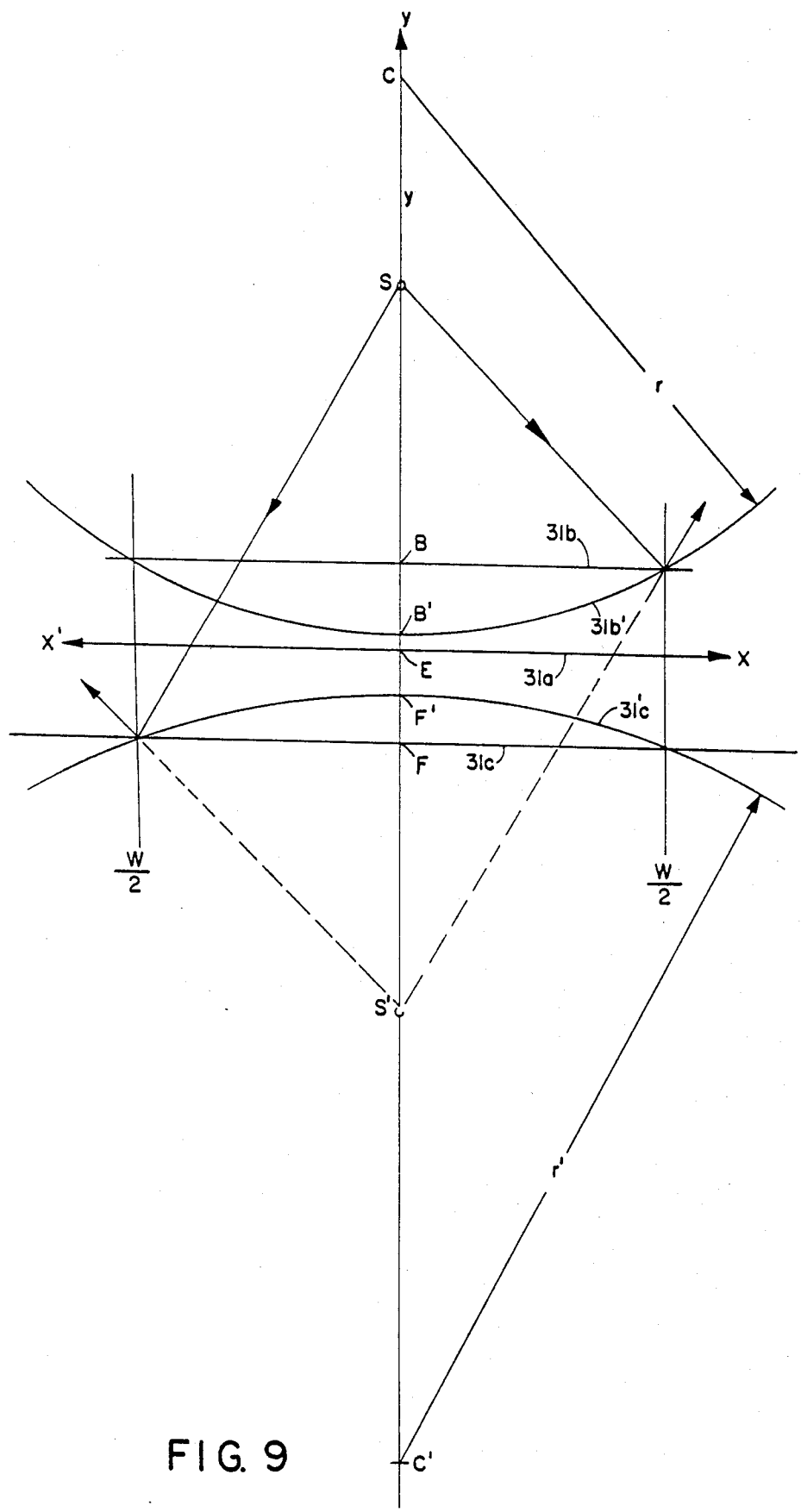
Figure 10:
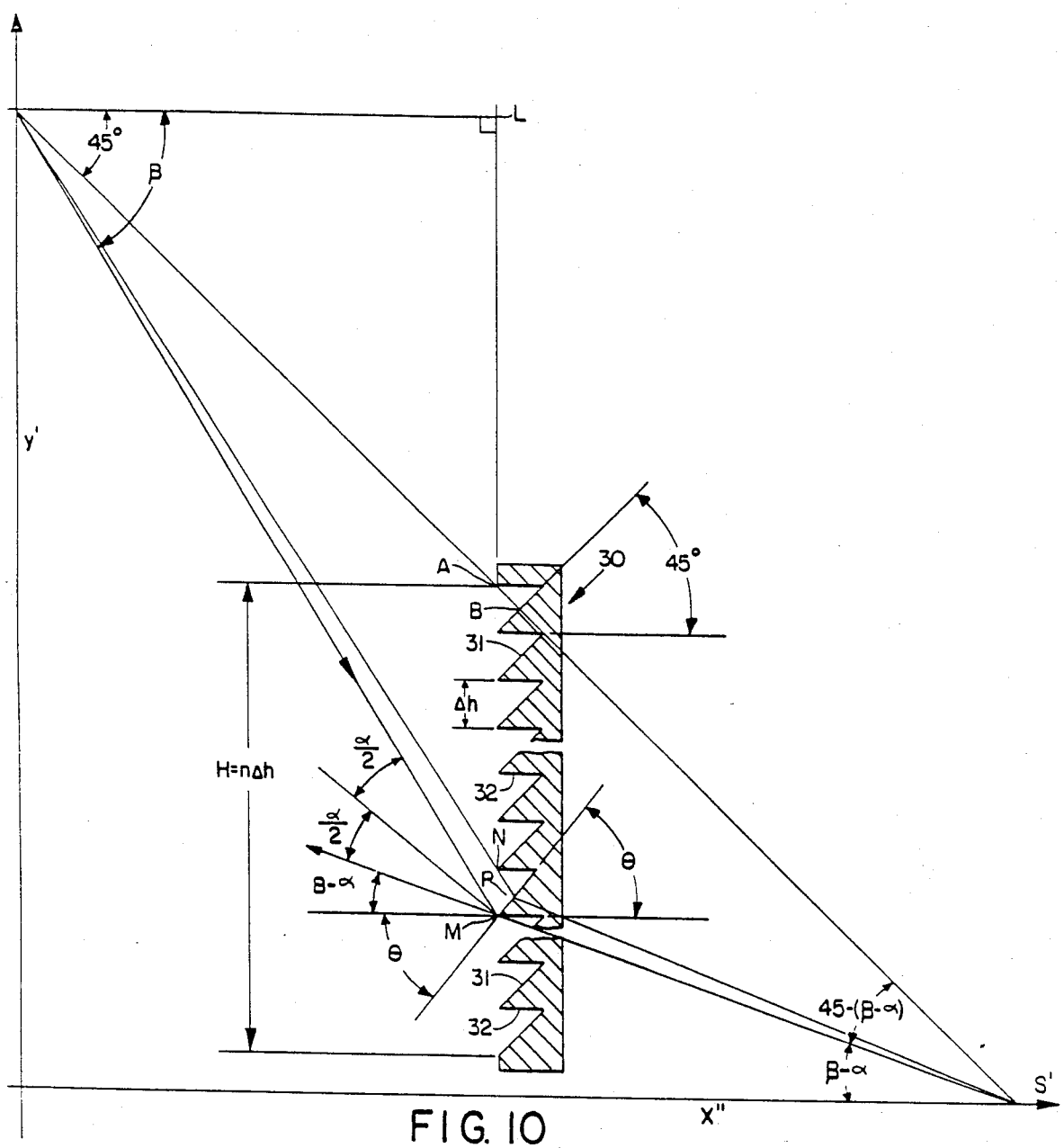
Figure 11:
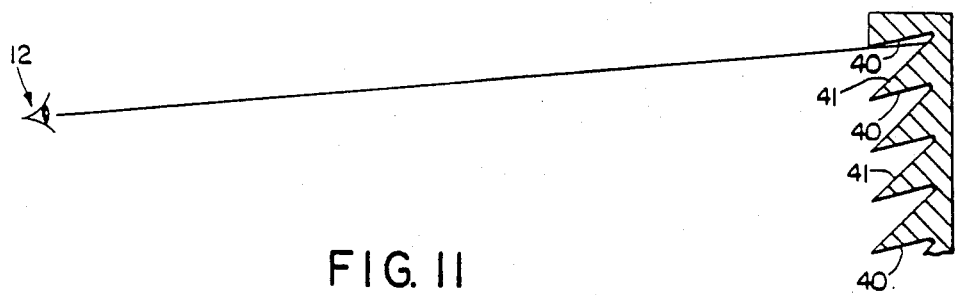

FIG. 8 is a diagrammatic sketch of portions of the apparatus of FIGS. 6 and 7, as seen essentially along the lines 8—8 in FIG. 7, illustrating modifications adapted to simulate a point source in a plane perpendicular to the planes of the mirror facets of the apparatus of FIGS. 6 and 7;

FIG. 9 is a diagrammatic sketch similar to FIG. 8, illustrating a modification of the apparatus of FIGS. 6 and 7 to take advantage of the principles illustrated in FIG. 8;

FIG. 10 is a view similar to FIGS. 6 and 7, illustrating a modification of the mirror facets adapted to simulate a point source in a plane normal to the mirror surfaces of the facets; and FIG. 11 is a fragmentary view similar to FIGS. 6 and 7 of a modification of the apparatus adapted to improve image quality, with parts broken away.

FIGS. 1 and 2 show a holographic viewing assembly comprising a hologram 1 mounted in a frame 2 formed integral with legs 3. The legs 3 are adapted to be wall-mounted by means of integral flanges 4, which can be mounted on a wall 5 in a viewing room by means such as screws 6.

As shown in FIG. 3, the hologram 1 may comprise a holographic image formed in any conventional manner in a photographic emulsion 7 on the surface of a glass plate 8. A cover plate 9, of glass or the like, is preferably mounted over the emulsion 7 for protection against dust, abrasion and the like. The cover plate 9 is preferably provided with an antireflection coating on its outside surface. The hologram may comprise a white light transmission hologram of the kind shown and described in U.S. Pat. No. 3,633,989, issued on Jan. 11, 1972 to Stephen A. Benton for Method for Making Reduced Bandwidth Holograms and assigned to the assignee of this application.

A mirror 10 having its reflecting surface on the side 11 confronting an observer at 12 is mounted in the frame 2 at an angle of 45° to the horizontal. A light absorbing panel 13, of wood, metal or plastic finished with a black matte surface, or of black velvet, or the like, is mounted in the frame 2 above the mirror 10, completing a triangle with the hologram 1 and the mirror 10. The structure may be completed with opaque side panels 14 secured to or formed integral with the frame 2.

A collimated source of light of any wavelength or combination or spectrum of wavelengths directed toward the hologram 1 at an angle of incidence of 45° from above (or below, if desired), as illustrated by typical rays 15, from a source on the observer's side of the apparatus, will pass through the hologram and be incident on the mirror 10 at 0°. This source should correspond to the reference source used in recording the hologram 1, or its conjugate except that the reference source should be monochromatic, while the illuminating source may be of any spectral content. These rays will then be reflected back through the hologram 1 toward the source, forming a virtual source simulating an illumination source behind the hologram 1, so that a slit image (or spectrum of images, as at 16', 16" if the illuminating source is not monochromatic) will be formed through which the recorded holographic image can be viewed by the observer at 12 in the manner described in the above cited U.S. Pat. No. 3,633,989.

Light from the direction of the observer at 12, indicated by rays 17, which would otherwise form a distracting mirror image of the observer, are reflected upwardly into the light absorbing trap 13. It will be apparent that other rays from the general direction of the observer at 12, at larger angles of incidence to the hologram 1 than the rays 17 and above, below or skewed relative to the axes of the rays 17, will similarly tend to be deflected into the trap 13.

The angle of 45° is not critical, although it will be used for convenience in the description of various embodiments below. Whatever the angle, however, the apparatus is most effective when the rays from the illuminating source are incident on the mirror 10 at 0°, as at other angles some of the light from the virtual source will be vignetted by the trap 13, or some of the surface of the mirror 10 will go unused. This may be considered an acceptable loss in efficiency for some purposes. Also, the mirror 10 need not be at 45° to the observer's line of sight, so long as most of the light from the observer's general direction is reflected into the trap 13.

FIG. 4 illustrates the illumination of the apparatus of FIGS. 1-3 with a point source S directed toward the hologram 1 from a location above the line of sight of the observer at 12 and on the same side of the apparatus as the observer. The uppermost ray 18 from the source S should be arranged to be incident on the mirror 10 at 0°, or as near thereto as may be chosen in the light of the considerations outlined above, while lower rays such as 19 will be incident on the mirror 10 at larger angles of incidence. Regardless of the wavelength spectrum of the source S, a virtual image of the source S will be formed at S' at the same distance from the mirror as the source S but behind and below the apparatus. This arrangement is adapted for the white light (or monochromatic) illumination of a hologram recorded with a point source of monochromatic light at S'.

If the hologram 1 is of height H (FIG. 4), the minimum depth of the apparatus behind the hologram will also be H. For use with a collimated monochromatic source of illumination, this depth can be reduced by replacing the mirror 10 with a prism 20, as illustrated in FIG. 5.

As shown in FIG. 5, the prism 20, of glass, plastic or the like, is arranged with its front face 21 vertical, to be mounted adjacent the hologram 1. A light absorber 22, such as a coating of black matte paint, black velvet or the like, covers the upper face 23 of the prism. The rear face 24 of the prism is provided with a mirror surface 25 on the side confronting the observer at 12.

If the angle of incidence of rays such as 26 from the illuminating source on the hologram 1 is $\theta$, the angle $\theta'$ between the faces 21 and 24 of the prism is chosen as a function of the index of refraction n of the prism 20 at the wavelength of the illuminating source such that $$\sin \theta' = \frac{\sin \theta}{n},$$

with the result that the rays such as 26 will be refracted into incidence with the mirrored surface 25 of the rear face 24 of the prism at an angle of 0°. These rays will then be reflected back along their original paths, forming a virtual image simulating a virtual collimated source below and behind the hologram 1 in the same manner as described above with reference to the apparatus of FIGS. 1-3.

Unwanted rays such as 27 from the general direction of the observer 12 in FIG. 6 will pass through the front face 21 of the prism 20 without substantial refraction, and will be reflected from the mirror surface 25 back to the inside of the face 21 at such an angle that they will be totally reflected into the light trap 23.

It can be shown by elementary trigonometry that the minimum depth behind the hologram 1 required for the prism 20 is $\frac{1}{2}$H sin 2$\theta'$, as compared with H for the apparatus of FIGS. 1-4. For example, if $\theta = 45°$ and $$n = 1.5, \theta' = \sin^{-1}\left(\frac{\sin 45}{1.5}\right) = 28.10°,$$

and the required depth is 0.416H.

FIG. 6 illustrates a modification requiring still less depth behind the hologram 1. In accordance with this embodiment, the mirror 10 is replaced by a Fresnel type mirror and absorber 30. The mirror-absorber 30 is made of light absorbing material, such as a synthetic resin chosen to be suitable for injection molding and for dimensional stability, such as polystyrene, a polycarbonate or the like, and filled with carbon black. The mirror and absorber 30 is selectively silvered, aluminized or otherwise formed with reflecting mirror facets 31 at 45° to the horizontal, to approximate the optical properties of the mirror 10 in FIG. 1 but in a thin, flat configuration requiring little depth behind the hologram 1. Unwanted light from the general direction of the observer at 12 is reflected by the mirror facets 31 up into the light absorbing bases 32 of the facets, to be absorbed by the light absorbing body of the mirror-absorber 30.

The number of reflecting facets 31 is not critical, although the depth of the mirror-absorber 30 may be smaller, the larger the number of facets.

The embodiment of FIG. 6 is adapted to simulate a collimated, or approximately collimated illuminating source behind and below the hologram 1 and of any spectral content, but will produce an image that is progressively degraded as an illuminating point source moves closer to the apparatus. This point is illustrated in FIG. 7, showing the illumination of the mirror-absorber 30 with a point source S above and on the same side of the apparatus 30 as the observer at 12.

Referring to FIG. 7, if the uppermost ray from the source S just clears the aperture at A and is incident at B on the uppermost facet 31 at an angle of 0°, lower rays such as 34, incident on a central facet 31 at E, and 35, incident on the lowermost facet 31 at F, will be at progressively greater angles of incidence, and will be incident at greater and greater distances from the source S. As a consequence of the greater distances from the source S, the virtual images of the source formed by the more distant facets 31 will be at progressively greater distances behind the apparatus.

In particular, if the height of each facet is $\Delta h$ and there are n facets such that the effective height H of the mirror-absorber 30 is $H = n\Delta h$, then the mth facet will be located in a plane at a distance p behind the plane of the uppermost facet given by $$p = \left(\frac{m-1}{\sqrt{2}}\right) \Delta h \qquad (1)$$

Thus, if the distance SA is D, the uppermost facet will form a virtual image of the source S at a distance $$D + \frac{\Delta h}{\sqrt{2}}$$

from its plane, where $$\frac{\Delta h}{\sqrt{2}}$$

is the distance AB, and the mth facet will form a virtual image of the source at a distance $$D + \frac{m\Delta h}{2}$$

from its plane. An embodiment of the invention in which the surfaces of the facets 31 are modified to correct for this effect will next be described in connection with FIGS. 8–10.

FIG. 8 is a diagrammatic view of typical mirror facets 31 of the apparatus of FIG. 7, as seen along the lines 8—8 in FIG. 7 in a plane normal to the planes of the mirror facets 31. Three mirror facet surfaces are shown. A first surface 31a corresponds to the central facet in FIG. 7 on which a central ray from the source S (34 in FIG. 7) is incident at point E. A second facet 31b corresponds to the uppermost facet in FIG. 7 on which a central ray is incident at point B (33 in FIG. 7). A third facet 31c corresponds to the lowermost facet in FIG. 7 on which a central ray is incident at point F (35 in FIG. 7).

Three coordinate axes y, x and x' are shown in relation to the mirror surfaces 31a, 31b and 31c in FIG. 8. The y axis is colinear with the optical axis on SES', the path of a central ray from S through E to S', where S' is the point at which the mirror surfce 31a will form a virtual image of the source S. The x axis extends, from $x=0$ at point E, positive to the right in FIG. 8 and normal to the y axis. The x' axis is colinear with the x axis, and extends from $x'=0$ at point E positive to the left in FIG. 8. It will be apparent that relationships between the facets 31a and 31b, to be described relative to the y and x axes, are symmetrical about the y axis, and that relationships between the facets 31a and 31c, to be described relative to the y and x' axes, are also symmetrical about the y axis. The two axes x and x' are introduced simply for economy of illustration, and to emphasize similarities between the various relationships, without the complication of negative distances, and of additional figures and basic reference characters.

If the width of the hologram 1, and of the mirror-absorber 30, is W, it will be apparent that the facets 31a, 31c and 31e extend outwardly from the y axis to $x_{max} = (W/2)$, $x'_{max} = (W/2)$, as indicated in FIG. 8.

Considering first the relationship between the mirror surfaces 31a and 31b, it will be apparent from the discussion above that the distance $$SB = D + \frac{\Delta h}{\sqrt{2}}$$

whereas the distance $$BE = \frac{H}{2\sqrt{2}} - \frac{\Delta h}{\sqrt{2}}$$

in terms of the parameters in FIG. 7. The distance ES' at which the facet 31a will form a virtual image S' of the source S is then $$D + \frac{H}{2\sqrt{2}}.$$

A typical ray from the source S at an acute angle $\psi$ to the y axis and incident on the surface 31a at point G will be reflected at such an angle that it will appear to emanate from the virtual source at S'. A ray in the same plane and incident on the surface 31b at point H would be reflected so as to appear to emanate from a closer point along the y axis, at a distance $$D + \frac{\Delta h}{\sqrt{2}}$$

from the point B. In order to cause the ray reflected from point H to appear to emanate from S', the surface 31b would have to be tipped relative to the x axis by some angle $\phi$ such that an extension of the reflected ray would be at that angle $\Gamma$ to the x axis appropriate to intersect the y axis at S'. In mathematical terms, the slope dy/dx of the surface 31b at the point H should be $(dy/dx) = \tan \phi$.

By inspection of FIG. 1, it will be apparent that the angle of incidence of the ray SH on a mirror surface displaced relative to the x axis by the angle $\phi$, i.e., the angle between the ray SH and the normal N to the displaced surface, will be $\psi - \phi$, with the reflected ray at the same angle $\psi - 100$ to the normal N. It follows that $180 = \Gamma + 90 - \psi + 2(\psi - \phi)$, or $$\phi = \frac{\Gamma + \psi}{2} - 45° \qquad (2)$$

Taking $x = BM$, and $$BS' = BE + ES' = D + \frac{H}{\sqrt{2}} - \frac{\Delta h}{\sqrt{2}}, \Gamma \quad (3)$$

is given by $$\Gamma = \tan^{-1}\left(\frac{D + \frac{H}{\sqrt{2}} - \frac{\Delta h}{\sqrt{2}}}{x}\right) \quad (3)$$

Similarly, since $$SB = D + \frac{\Delta h}{\sqrt{2}},$$

$$\psi = \tan^{-1}\left(\frac{x}{D + \frac{\Delta h}{\sqrt{2}}}\right) \quad (4)$$

The appropriate values of $dy/dx = \tan \phi$ for each of a series of values of x from $x=0$, $dy/dx=0$ to $x=W/2$, $$dy/dx = f\left(\frac{W}{2}\right)$$

could be computed from the above equations, and by appropriate integration techniques, the functions $y=Q(x)$ necessary to describe the surfaces of corrected facets 31b and other facets between 31b and 31a could be computed. The resultant surface would be hyperoloidal, and for most practical purposes the computational and constructional difficulties involved, through not insuperable, would be unnecessary. The manner in which the desired contours can be sufficiently approximated with cylindrical surfaces will next be described with reference to FIGS. 8 and 9.

FIG. 9 illustrates the replacement of the plane surface 31b with a cylindrical surface 31b′ defined by a circle of radius r having a center at C on the y axis such that the slope dy/dx of the cylindrical surface 31b′ at $x=(W/2)$ is given by $$dy/dx = \tan \phi \left(\frac{W}{2}\right). \quad$$

Thus, the ends of the surface 31b′ are kept in the plane of the original surface 31b, whereas the center is displaced (by a very small distance) to B′. It will be apparent that the reflections of the central ray SB′ and of the extreme ray incident on 31b′ at $x=(W/2)$ will both appear to emanate from S′, whereas reflections of intermediate rays will appear to emanate approximately from S′. The error in the intermediate rays will be very small for reasonable values of the parameters.

The circle of radius r having a center at C may be defined by the equation $$(y-a)^2 + x^2 = r^2, \quad (5)$$

where $y=0$ at $x=(W/2)$
Thus, $$a = \sqrt{r^2 - W^2/4} \quad (6)$$

Differentiating (5) with respect to x and simplifying, one obtains $$dy/dx = \frac{-x}{y-a} \quad (7)$$

at $x-W/2$, $$dy/dx = \tan \phi \left(\frac{W}{2}\right)$$

and $y=0$
From (6) and (7) and the above values, one obtains $$\tan \phi \left(\frac{W}{2}\right) = \frac{W}{2\sqrt{r^2 - \frac{W^2}{4}}} \quad (8)$$

from which the value of r can be obtained. To give a specific illustrative example, assume that the hologram 1 is 10 inches wide ($W=10$; $x=5$) by 12 inches high (H12), and that there are 100 facets 31 in the mirror-absorber 30, so that $$\Delta h = \frac{12}{100} = 0.12 \text{ inches.}$$

Let the distance $D = SA = 60$ inches.
From Equation (3), $$\Gamma\left(\frac{W}{2}\right) = \tan^{-1}\frac{\left(60 + \frac{12}{\sqrt{2}} - \frac{12}{\sqrt{2}}\right)}{5} = 85.8192°$$

From Equation (4), $$\psi\left(\frac{W}{2}\right) = \tan^{-1}\left(\frac{5}{60 + \frac{12}{\sqrt{2}}}\right) = 4.7570°$$

From Equation (2), $$\phi\left(\frac{W}{2}\right) = 85.8192 + 4.7570 - 45° = 0.2881°$$

Rearranging Equation (8), $$r = \frac{W}{2}\sqrt{1 + \frac{1}{\tan^2 \phi\left(\frac{W}{2}\right)}} = 5\sqrt{1 + \frac{1}{\tan^2 0.2881}} \quad (8a)$$

$$r = 994.3777 \text{ inches,} \quad (8b)$$

or about 82.9 feet
From Equations (5) and (6) and FIG. 9, it is apparent that at $x=0$, $$y = a \pm r \quad (9)$$

and that $$BB' = r - a = 994.3777 - \sqrt{994.3777^2 - 25} \quad (10)$$

$$BB' = 0.01257 \text{ inches} \quad (10a)$$

Thus, the required curvature is quite small, although significant.

Referring again to FIG. 8, by similar reasoning, it is apparent that a ray from S making an angle $\psi'$ with the y axis and incident on the facet 31c and J would reflect as though from a source more distant than S'. Accordingly, the correct tangent to the surface 31c at point J should be tipped relative to the x' axis by an angle $\Phi'$ such that the reflected ray will have that angle $\Gamma'$ to the x' axis that will result in intersection of the extended ray with S'. The angle of incidence at J will then be $\Phi' + \psi'$ relative to the new normal N'. By inspection of FIG. 8, $$180 = \Gamma' + \Phi' + 90 - \Phi' - \psi' + 2\Phi' + 2\psi' \quad (11)$$

or $$\Phi' = 45° - \left(\frac{\Gamma' + \psi'}{2}\right) \quad (11b)$$

from FIG. 8, $$\Gamma' = \tan^{-1} \frac{FS'}{FJ}, \quad (12)$$

Since $$FS' = ES' - EF = D + \frac{H}{2\sqrt{2}} - \frac{H}{2\sqrt{2}} = D, \text{ and } FJ = x'$$

$$\Gamma' = \tan^{-1}\left(\frac{D}{x'}\right) \quad (12b)$$

Similarly, $$\psi' = \tan^{-1}\left(\frac{FJ}{SF}\right) \quad (13)$$

or $$\psi' = \tan^{-1}\left(\frac{x'}{D + \frac{H}{\sqrt{2}}}\right) \quad (13b)$$

The correct value for dy/dx' at point J is $$dy/dx' = \tan \phi' \quad (14)$$

From FIG. 9, in the light of the above discussion the corrected facet 31c' may be assumed to lie along a circle of radius r' with a center at C', and described by $$(y + b)^2 = (x')^2 = (r')^2 \quad (15)$$

such that y = 0 when x' = (W/2), so that $$b = \sqrt{(r')^2 - \left(\frac{W}{2}\right)^2} \quad (16)$$

From (15) and (16), it is readily shown that at x = 0, $$y = +r' - \sqrt{(r')^2 - \left(\frac{W}{2}\right)^2} \quad (17)$$

From FIG. 9, it is thus apparent that $$FF' = r' - \sqrt{(r')^2 - \left(\frac{W}{2}\right)^2} \quad (18)$$

Differentiating Equation (15) and simplifying, one obtains $$dy/dx' = -\tan \phi' = -\frac{x'}{y + b} \quad (19)$$

at $x' = \frac{W}{2}, y = 0, b = \sqrt{(r')^2 - \left(\frac{W}{2}\right)^2}$, $$\tan \phi'\left(\frac{W}{2}\right) = \frac{W}{2\sqrt{(r')^2 - \left(\frac{W}{2}\right)^2}} \quad (20)$$

Rearranging, $$r' = \frac{W}{2}\sqrt{1 + \frac{1}{\tan^2 \phi'\left(\frac{W}{2}\right)}} \quad (20a)$$

To continue the example given above, from Equation (12b), with x' = (W/2) = 5, $$\Gamma' = \tan^{-1}\left(\frac{60}{5}\right) = 85.2364° \quad (12c)$$

and from (13b), $$\psi' = \tan^{-1}\left(\frac{5}{60 + \frac{12}{\sqrt{2}}}\right) = 4.1757° \quad (13c)$$

Thus, from (11b), $$\phi'\left(\frac{W}{2}\right) = 45 - \left(\frac{85.2364 + 4.1757}{2}\right) = 0.2940° \quad (11c)$$

and from (20a), $$r = 5\sqrt{1 - \frac{1}{\tan^2 0.2940}} = 974.4225 \text{ inches,} \quad (20b)$$

or about 81.2 feet

From (18), $$FF = 974.4225 - \sqrt{974.4225^2 - 25} = 0.01283 \text{ inches}$$

Referring again to FIG. 7, the increasing distance from the source S to the facets 31 from top to bottom of the mirror-absorber 30 will also cause progressive displacement of the virtual image formed by the facets in the plane of FIG. 7. Modification of the facets 31 to correct for this phenomenon will next be described with reference to FIG. 10.

FIG. 10 shows the mirror-absorber 30 referenced to a set of orthogonal coordinate axes y' and x", the axis y' being parallel to the face of the mirror-absorber 30. The source S is at a distance SA from the top of the aperture of the mirror-absorber 30, where SA=D. The distances SL and LA in FIG. 11 are then $$\frac{D}{\sqrt{2}},$$

assuming that the angle of incidence to the face of the mirror-absorber 30 is 45° as shown. The distances from the top to the bottom of each facet 31 are each $\Delta h$, so that if there are n facets 31 the total vertical aperture $H = n\Delta h$.

The uppermost facet 31 is at an angle of 45° to the x" axis, as before. However, the angles of the lower facets to the x" axis, typified by the angle $\theta$ between a lower facet, such as the mth facet on which an extreme ray along SM would be incident at the face of the mirror-absorber 30, will not be constant, but will be determined in the light of considerations next to be considered.

It will be apparent that the distance AM in FIG. 11 is equal to $m\Delta h$, where m is an integer $1 < m \leq n$. The angle $\beta$ between the x" axis and the ray along SM is then given by $$\beta = \tan^{-1}\left[\frac{\frac{D}{\sqrt{2}} + m\Delta h}{\frac{D}{\sqrt{2}}}\right] \quad (21)$$

or $$\beta = \tan^{-1}\left[1 + \frac{m\Delta h \sqrt{2}}{D}\right] \quad (21b)$$

In order to correct for the difference in distance from S between the first, or uppermost facet 31 and the mth facet, the angle $\theta$ is chosen so that the ray along SM will be reflected at that angle $\alpha$ that will cause the reflected ray to appear to emanate from S', the point at which rays from S that are reflected from the uppermost facet will form a virtual image. The angle of incidence of the ray along SM relative to the normal N" will then be $(\alpha/2)$. The point S' is at a distance AS' from the point A equal to $D + \Delta h\sqrt{2}$.

From FIG. 10, it is apparent that the angle between the x" axis and the line S'M is $\beta - \alpha$, so that the angle $AS'M = 45 - (\beta - \alpha)$. Applying the law of sines, $$\frac{AM}{\sin[45 - (\beta - \alpha)]} = \frac{AS'}{\sin[90 + (\beta - \alpha)]} \quad (22)$$

or $$\frac{m\Delta h}{D + \Delta h\sqrt{2}} = \frac{\sin 45 \cos(\beta - \alpha) - \cos 45 \sin(\beta - \alpha)}{\sin 90 \cos(\beta - \alpha) + \cos 90 \sin(\beta - \alpha)} \quad (22b)$$

Simplifying and rearranging, and solving for $(\beta - \alpha)$, one obtains $$\beta - \alpha = \tan^{-1}\left[\frac{m}{1 + \frac{D}{\Delta h \sqrt{2}}}\right] \quad (22c)$$

Since the angle between the mth facet and the x" axis is $\theta$, as shown, and the angle between the mth facet and its normal N" is 90°, it will be apparent that $$90 = \theta + \beta - \alpha + \frac{\alpha}{2} \quad (23)$$

rearranging, $$\theta = 90 - \beta + \frac{\alpha}{2} \quad (23a)$$

To continue the above example, in which H=12, n=100, $\Delta h$=0.12, for the lowermost facet 31 where m=n=100, from Equation (21b), $$\beta = \tan^{-1}\left[1 + \frac{12\sqrt{2}}{60}\right] = 52.0629° \quad (21c)$$

from Equation (22c)

$$\beta - \alpha = \tan^{-1}\left[1 - \frac{100}{1 + \frac{60}{.12\sqrt{2}}}\right] = 35.6767° \quad (22d)$$

Thus, $\alpha = 52.0629 - 35.6767 = 16.3862°$

From (23a)

$$\theta = 90 - 52.0629 + \frac{16.3862}{2} = 46.1302° \quad (23b)$$

The angles of the intermediate facets may be calculated from the above equations using appropriate values of m, and will lie between 45° and 46.1302°.

It will be apparent that the collection of rays from S falling on the mth facet, and for example an extreme ray along the line SP in FIG. 10, will all form a virtual image of S at a distance greater than S'. Thus, even though the ray reflected from M will appear to emanate precisely from S', the ray reflected from P will very nearly, but not precisely, appear to emanate from S'. If desired, this discrepancy can be corrected by curving the facets other than the uppermost in a manner analogous to that discussed above in connection with FIGS. 8 and 9. In particular, the correct value of $\theta = \theta'$ can be calculated for the point P, and the correct normal N''' at P can be found. The points P and M can then be located on a circle having a center at the intersection of the normals N" and N''', such that the corrected surface of the mth facet will lie on a cylinder having its center at the center of the circle so located. Preferably, the tedious calculations, and the difficulties in constructing the mold for the mirror-absorber 30 that this second order correction would involve, are avoided by simply making the value of n large enough so that no correction is necessary, as it would not be in the particular example given.

In the manufacture of a corrected mirror-absorber 30 as described above, a mold would be made from a suitable metal conforming to the complement of the desired configurations of the facets with appropriate values $\theta$ for the angles of the facets. The mold would then be warped to incorporate the curvatures described above in connection with FIGS. 8 and 9, and dimensionally stabilized by appropriate heat treatment.

The facets 31 would then be ground and polished, and a desired number of mirror-absorbers 30 made from the mold by injection molding, or preferably by compression molding, techniques. Finally, the facets 31 would be selectively silvered or aluminized for the desired mirror finish.

FIG. 11 illustrates a modification applicable to all of the fresnel type mirror-absorber constructions described above, which permits enhancement of the final image in uniformity. As shown, rather than having the light absorbing surfaces 40 above each facet 41 horizontal, as are the surface 32 above the facets 31 in the corresponding preceding views, the surfaces 40 are tilted upwardly away from the observer at 12, and the mirror surfaces 41 continued upwardly, enough so that the observer's line of sight always intersects a mirror surface 41, rather than a portion of a light absorbing surface 40.

While the invention has been described with reference to the details of various illustrative embodiments, many obvious changes and variations will be apparent to those skilled in the art upon reading this description, and such may be made without departing from the scope of the invention.

Having thus described the invention, what is claimed is:

1. A mirror-absorber especially adapted for use in the illumination of transmission holograms and comprising a generally rectangular block of light absorbing material having first and second spaced apart faces, with major dimensions substantially equal to or greater than the major dimensions of a transmission hologram to be illuminated, said first face being formed with a parallel array of stepped segments of generally triangular cross-section, each segment being formed on one face with a mirror surface.

2. The apparatus of claim 1, in which said mirror surfaces are disposed at 45° to a plane defined by the major dimensions of said first face such that said array comprises a mirror capable of forming a virtual image of a collimated source incident on said mirror surfaces at 0°.

3. The apparatus of claim 1, in which said mirror surfaces are disposed at an array of angles to a first plane defined by the major dimensions of said first face progressively increasing from 45° at a first end of said array to an angle $\theta$ at a second end opposite said first end of said array, and in which said segments are progressively curved in respective second planes normal to said first plane from said first end to said second end, said angle $\theta$ and said curvature being selected to form a virtual image of a point source directed toward said first face.

* * * * *